(12) United States Patent
Strock

(10) Patent No.: US 10,247,026 B2
(45) Date of Patent: Apr. 2, 2019

(54) EROSION RESISTANT COATING FOR AIR SEAL

(71) Applicant: UNITED TECHNOLOGIES CORPORATION, Hartford, CT (US)

(72) Inventor: Christopher W. Strock, N. Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 386 days.

(21) Appl. No.: 15/027,278

(22) PCT Filed: Oct. 21, 2014

(86) PCT No.: PCT/US2014/061450
§ 371 (c)(1),
(2) Date: Apr. 5, 2016

(87) PCT Pub. No.: WO2015/076962
PCT Pub. Date: May 28, 2015

(65) Prior Publication Data
US 2016/0245109 A1 Aug. 25, 2016

Related U.S. Application Data

(60) Provisional application No. 61/906,524, filed on Nov. 20, 2013.

(51) Int. Cl.
*F01D 11/08* (2006.01)
*F01D 11/02* (2006.01)
(Continued)

(52) U.S. Cl.
CPC ............ *F01D 11/08* (2013.01); *C09D 121/00* (2013.01); *C09D 175/04* (2013.01); *F01D 11/02* (2013.01); *F01D 11/122* (2013.01); *F04D 29/023* (2013.01); *F04D 29/526* (2013.01); *F16J 15/44* (2013.01); *F05D 2220/32* (2013.01);
(Continued)

(58) Field of Classification Search
CPC ........ F01D 11/02; F01D 11/08; F01D 11/122; F16J 15/44; C09D 121/00; C09D 175/04; F05D 2220/32; F05D 2220/329; F05D 2240/55; F05D 2260/607; F05D 2300/431;
(Continued)

(56) References Cited

U.S. PATENT DOCUMENTS

| | | | |
|---|---|---|---|
| 5,536,022 A * | 7/1996 | Sileo | C23C 4/02 277/415 |
| 5,897,920 A | 4/1999 | Sileo et al. | |
| 6,334,617 B1 | 1/2002 | Putnam et al. | |

(Continued)

FOREIGN PATENT DOCUMENTS

DE 102010052729 A1 5/2012

OTHER PUBLICATIONS

Supplementary European Search Report for European Application No. 14864151.7 dated Jun. 21, 2017.
(Continued)

*Primary Examiner* — Igor Kershteyn
(74) *Attorney, Agent, or Firm* — Carlson, Gaskey & Olds, P.C.

(57) ABSTRACT

A seal is formed of a matrix and includes hard particles. The matrix has a shear strength of greater than or equal to 200 psi and less than or equal to 2000 psi. A gas turbine engine is also disclosed.

17 Claims, 1 Drawing Sheet

(51) Int. Cl.
    *F16J 15/44*     (2006.01)
    *C09D 121/00*     (2006.01)
    *C09D 175/04*     (2006.01)
    *F01D 11/12*     (2006.01)
    *F04D 29/02*     (2006.01)
    *F04D 29/52*     (2006.01)

(52) U.S. Cl.
    CPC .... *F05D 2220/329* (2013.01); *F05D 2240/55* (2013.01); *F05D 2260/607* (2013.01); *F05D 2300/431* (2013.01); *F05D 2300/506* (2013.01); *F05D 2300/615* (2013.01); *F05D 2300/70* (2013.01); *Y02T 50/675* (2013.01)

(58) Field of Classification Search
    CPC ......... F05D 2300/607; F05D 2300/615; Y02T 50/675
    See application file for complete search history.

(56) References Cited

U.S. PATENT DOCUMENTS

| | | | |
|---|---|---|---|
| 6,844,392 B2 * | 1/2005 | Suman | C09D 5/03 277/415 |
| 6,899,339 B2 * | 5/2005 | Sanders | F01D 11/122 277/355 |
| 7,955,049 B2 * | 6/2011 | Hopkins | F01D 11/122 415/173.4 |
| 8,020,875 B2 * | 9/2011 | Putnam | F01D 11/122 277/415 |
| 2003/0042685 A1 | 3/2003 | Sanders et al. | |
| 2010/0129636 A1 * | 5/2010 | Cybulsky | C04B 41/009 428/310.5 |
| 2010/0136349 A1 * | 6/2010 | Lee | C04B 41/009 428/446 |
| 2012/0099968 A1 | 4/2012 | Zajchowski et al. | |
| 2013/0078085 A1 | 3/2013 | Strock et al. | |

OTHER PUBLICATIONS

International Search Report from corresponding PCT application, PCT/US14/61450, dated Jan. 28, 2015.
International Preliminary Report on Patentability for International Application No. PCT/US2014/061450 dated Jun. 2, 2016.

* cited by examiner

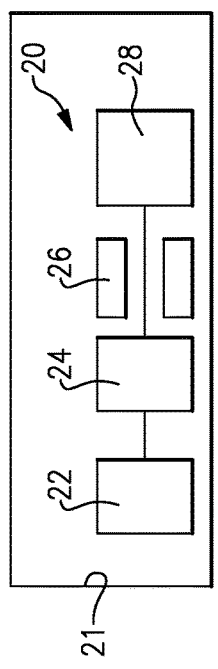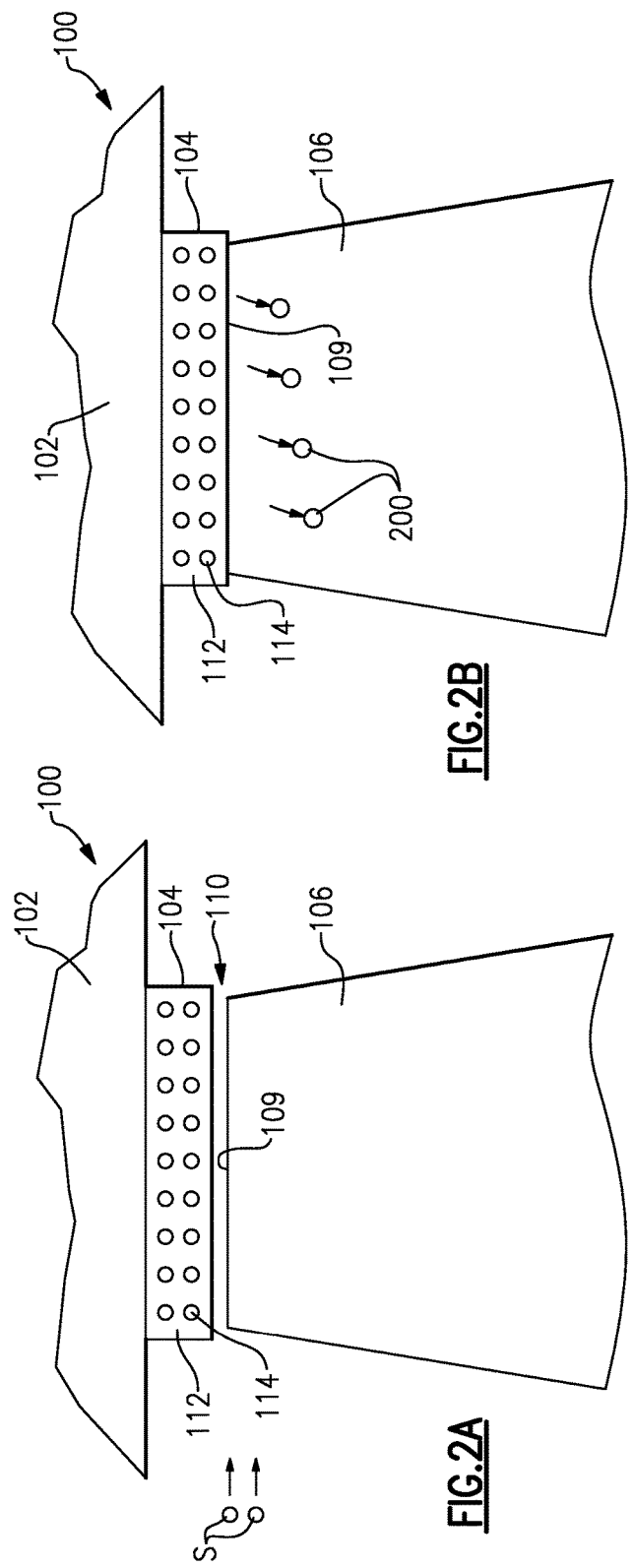

EROSION RESISTANT COATING FOR AIR SEAL

CROSS-REFERENCE TO RELATED APPLICATION

This application claims priority to U.S. Provisional Application No. 61/906,524, filed Nov. 20, 2013.

BACKGROUND OF THE INVENTION

This application relates to a composite coating that is designed to resist erosion in a gas turbine engine section.

Gas turbine engines are known and, typically, include a compressor which compresses air and delivers it into a combustion section. The air is mixed with fuel and ignited in the combustion section and products of the combustion pass downstream over turbine rotors.

Recently, the efficiency of the gas turbine engine is a source of much design concentration. One aspect leading to greater efficiency is to ensure that the bulk of the energy delivered to the compressor section is effectively used to compress the air delivered into the combustion section. To this end, clearances between rotating compressor blades and an outer seal are maintained as tight as possible.

However, recently aircraft are utilized in more challenging environments where particulate erosion can increase these clearances. As an example, aircraft are often used in environments in which particulate material is mixed with air. This becomes particularly challenging in helicopter mounted gas turbine engines as they are even more often utilized in dusty environments.

The sand impacts the coating layers at a low angle and is abrasive.

Thus, it is desirable to form abrasion resistant coatings. However, it also sometimes occurs that the blade length can increase, such as during a surge condition, and contact the coating. Under such conditions, it would not be desirable for the coating to be too strong as this can damage the blade.

SUMMARY OF THE INVENTION

In a featured embodiment, a seal is formed of a matrix and includes hard particles. The matrix has a shear strength of greater than or equal to 200 psi and less than or equal to 2000 psi.

In another embodiment according to the previous embodiment, the shear strength is between 750 and 1500 psi.

In another embodiment according to any of the previous embodiments, the shear strength is between 900 and 1250 psi.

In another embodiment according to any of the previous embodiments, the matrix is a polymer.

In another embodiment according to any of the previous embodiments, the polymer is one of a rubber and polyurethane.

In another embodiment according to any of the previous embodiments, the hard particles are selected from a group including alumina, silicone, carbide and zirconia.

In another embodiment according to any of the previous embodiments, the matrix is formed of a metal.

In another embodiment according to any of the previous embodiments, the metal includes a nickel alloy including a weakening agent.

In another embodiment according to any of the previous embodiments, the hard particles have a hardness of greater than or equal to 7.0 on a mohs scale.

In another embodiment according to any of the previous embodiments, the particles have a hardness greater than or equal to 9.0 on the mohs scale.

In another embodiment according to any of the previous embodiments, the matrix includes 20 to 80 percent of the seal by volume.

In another embodiment according to any of the previous embodiments, the matrix material includes 30 to 50 percent by volume of the seal.

In another featured embodiment, a gas turbine engine comprises a rotating blade and a seal positioned radially outwardly of a radially outer tip of the rotating blade. The seal is formed of a matrix and includes hard particles. The matrix has a shear strength of greater than or equal to 200 psi and less than or equal to 2000 psi.

In another embodiment according to the previous embodiment, the blade and seal are is included in a compressor.

In another embodiment according to any of the previous embodiments, the shear strength is between 750 and 1500 psi.

In another embodiment according to any of the previous embodiments, the shear strength is between 900 and 1250 psi.

In another embodiment according to any of the previous embodiments, the matrix is a polymer.

In another embodiment according to any of the previous embodiments, the matrix is formed of a metal.

In another embodiment according to any of the previous embodiments, the particles have a hardness greater than or equal to 9.0 on the mohs scale.

In another embodiment according to any of the previous embodiments, the matrix includes 20 to 80 percent of the seal by volume.

In another embodiment according to any of the previous embodiments, the matrix material includes 30 to 50 percent by volume of the seal.

These and other features may be best understood from the following drawings and specification.

BRIEF DESCRIPTION OF THE DRAWINGS

FIG. 1 schematically shows a gas turbine engine.
FIG. 2A shows a coating.
FIG. 2B shows a condition which can occur in the gas turbine engine of FIG. 1.

DETAILED DESCRIPTION

FIG. 1 schematically shows a gas turbine engine 20. The gas turbine engine 20 is shown schematically mounted on a helicopter 21.

A fan 22 delivers air into a compressor section 24. The air is compressed and delivered into a combustor section 26, where it is mixed with fuel and ignited. Products of this combustion pass downstream over turbine rotors 28 driving them to rotate.

FIG. 2A shows a compressor section 100 which may be incorporated into the engine 20 of FIG. 1. As known, a plurality of rotating blades 106 are spaced closely adjacent to a seal 104. There is a clearance 110 between a tip 109 of the blade 106 and an inner surface of the seal 114. It is desirable to maintain this clearance 110 relatively small to increase the efficient use of the air delivered into the compressor section.

Sand particles S are shown which may be ingested into the air delivered axially at the compressor blade 106. These sand particles contact the seal 104 at a relatively low angle. The relatively low angle may be 30° or less and may typically be somewhere between 10 and 20°.

Ceramic materials are known which are resistant to the low angle abrasive contact from particles such as sand particles S. However, as mentioned above, the use of a coating which may be too hard can raise challenges. Thus, the seal 104 is formed as a plurality of hard particles 114 positioned in a softer polymer matrix 112.

The polymer matrix may be formed of a rubber, such as RTV silicone. Alternatively, polyurethane, epoxy or other suitable materials may be used for the matrix.

The hard particles may be any number of hard materials. Preferably, the hard particles have a hardness greater than or equal to 7.0 and less than or equal to 10.0 on the mohs scale. More narrowly, the hardness would be greater than or equal to 7.0 and even more narrowly greater than or equal to 9.0.

The particles may be chosen from abrasives, such as alumina, silicon carbide, zirconia and others.

The matrix is selected such that a shear strength of the matrix is greater than or equal to 200 psi and less than or equal to 2000 psi. More narrowly, the shear strength is between 750 and 1500 psi. Even more narrowly, the shear strength is between 900 and 1250 psi.

The matrix preferably accounts for 20 to 80 percent by volume of the overall seal 104. More narrowly, it is between 30 and 50 percent.

The seal 104 may have a thickness of approximately 1/10 of an inch.

Now, as shown in FIG. 2B the blade 106 is undergoing a challenging situation such as a surge condition on the compressor. The tip 109 may contact the inner surface of the seal 104. Since the shear strength of the matrix 112 is so low, rather than damaging the blade 106, the hard particles 114 will separate away from the seal 104. This is shown schematically at 200. In this manner, the blade will not be damaged and the seal 104 left after the incident will still include the hard particles which are resistant to erosion.

While the above embodiments utilize a polymer for the matrix, a metal may also be utilized as the matrix material provided it meets the shear strength range as set forth above. As an example, a nickel alloy could be provided with a weakening agent such as a hexagonal boron nitride. This is a known agent that would make the nickel alloy weaker, such that it would fall within the shear strength range as mentioned above.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A seal comprising:
    a seal formed of a matrix and including hard particles, said matrix having a shear strength of greater than or equal to 200 psi and less than or equal to 2000 psi; and
    wherein the matrix material comprises 30 to 50 percent by volume of the seal.

2. The seal as set forth in claim 1, wherein said shear strength is between 750 and 1500 psi.

3. The seal as set forth in claim 2, wherein said shear strength is between 900 and 1250 psi.

4. The seal as set forth in claim 1, wherein said matrix is a polymer.

5. The seal as set forth in claim 4, wherein said polymer is one of a rubber and polyurethane.

6. The seal as set forth in claim 1, wherein said hard particles are selected from a group including alumina, silicone, carbide and zirconia.

7. The seal as set forth in claim 1, wherein said matrix is formed of a metal.

8. The seal as set forth in claim 7, wherein said metal includes a nickel alloy including a weakening agent.

9. The seal as set forth in claim 1, wherein said hard particles have a hardness of greater than or equal to 7.0 on a mohs scale.

10. The seal as set forth in claim 9, wherein said particles have a hardness greater than or equal to 9.0 on the mohs scale.

11. A gas turbine engine comprising:
    a rotating blade; and
    a seal positioned radially outwardly of a radially outer tip of said rotating blade, said seal formed of a matrix and including hard particles, said matrix having a shear strength of greater than or equal to 200 psi and less than or equal to 2000 psi; and
    wherein the matrix material comprises 30 to 50 percent by volume of the seal.

12. The gas turbine engine as set forth in claim 11, wherein said blade and seal are included in a compressor.

13. The gas turbine engine as set forth in claim 11, wherein said shear strength is between 750 and 1500 psi.

14. The gas turbine engine as set forth in claim 13, wherein said shear strength is between 900 and 1250 psi.

15. The gas turbine engine as set forth in claim 11, wherein said matrix is a polymer.

16. The gas turbine engine as set forth in claim 11, wherein said matrix is formed of a metal.

17. The gas turbine engine as set forth in claim 11, wherein said particles have a hardness greater than or equal to 9.0 on the mohs scale.

* * * * *